July 21, 1964 E. V. HORNER 3,141,794
PAINTER'S MASK FOR PNEUMATIC TIRES
Filed March 24, 1961
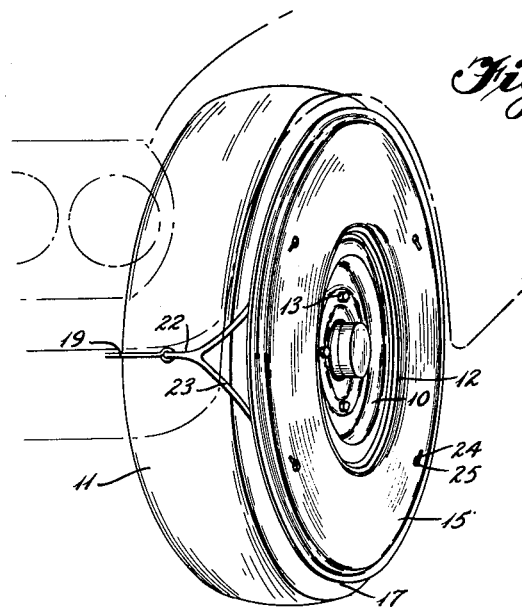
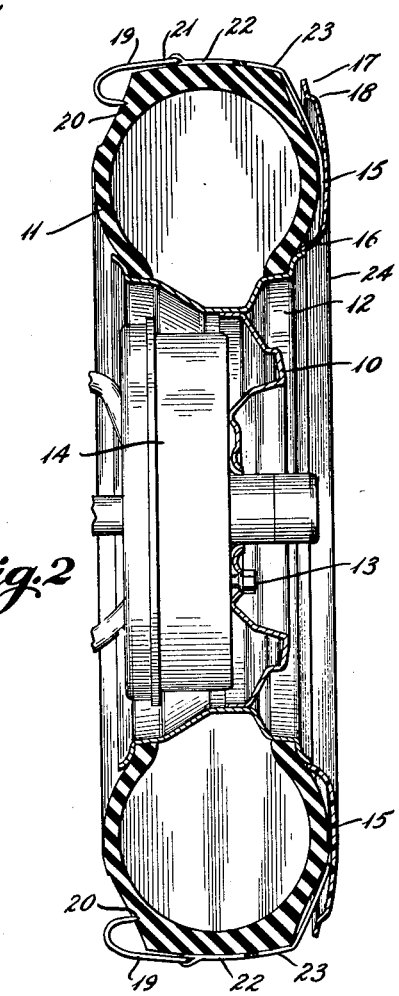
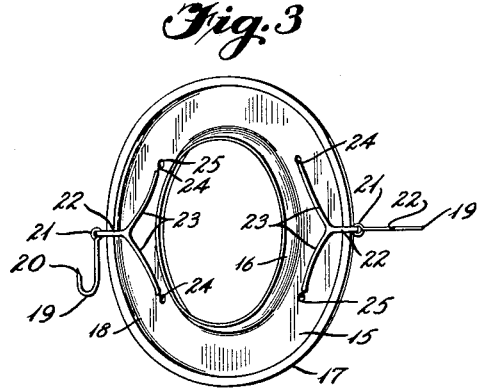
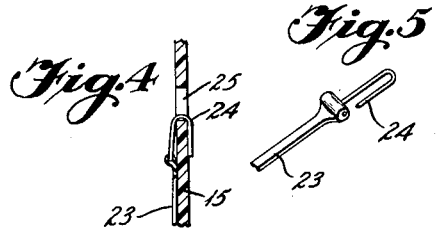
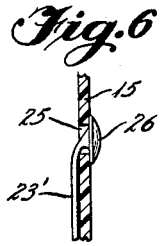
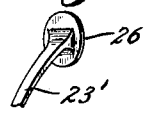
INVENTOR
*Earl V. Horner*
BY *A. Yates Dowell.*
ATTORNEY

United States Patent Office 3,141,794
Patented July 21, 1964

3,141,794
PAINTER'S MASK FOR PNEUMATIC TIRES
Earl V. Horner, 57 Hopkins St., Newport News, Va.
Filed Mar. 24, 1961, Ser. No. 98,083
4 Claims. (Cl. 118—505)

This invention relates to the refinishing and painting of various objects including those having portions which it is desired to mask and protect from paint when it is applied to other portions of such objects, and to equipment by which such masking or protecting is accomplished and particularly when painting the wheels of motor vehicles without the removal of the pneumatic tires or the painting of such tires.

The invention is an improvement over that of my earlier Patent 2,726,634, granted December 13, 1955, in the provision of improved means for quickly attaching the mask to the tire with a minimum of effort and concentration.

Much time and effort have been expended in the masking of surfaces, including those of pneumatic tires, to prevent their being painted during the painting of wheels or nearby surfaces and particularly when the method of painting was by spraying. Efforts have been made to solve this problem as evidenced by the aforementioned patent, the mask of which contained four equally spaced elongated openings through which adhesive tape was applied to fasten the mask to the tire. Before such patent a very substantial amount of time and attention was necessary in the application of the mask with the subsequent painting of a wheel on which the tire was mounted requiring much less time than the time required for the application of the mask. By the mask of the aforementioned patent, the time of masking a tire and painting the supporting wheel was materially reduced. However too much time, unhurried concentrated attention, and effort still were necessary in the application of the mask.

It is an object of the invention to provide a painter's mask for a pneumatic tire which is relatively thin, simple and inexpensive, can be easily and quickly in fact almost instantly applied and removed, which will be retained under tension in intimate flexed contact with the tire, and which will effectively and satisfactorily perform the masking function for which it was produced.

Another object of the invention is to provide a device of the character indicated which can be held by a couple of spaced holders and can be applied by holding the mask between the two hands and fitted in place by substantially a single outward motion of the hands from the body towards and in contact with the tire.

A further object of the invention is to provide a painter's mask for a pneumatic tire in the form of a relatively thin flexible ring and mounting means therefor including an elastic at each side anchored between spaced points, with a hook attached to the central portion of such elastic and which hooks can be engaged with the tire by the single motion of the hands toward the tire, and when applied the tension of the elastic will maintain the intimacy of the mask with the tire.

A still further object of the invention is to provide a painter's mask of the character indicated which is durable and with its spaced edges of a configuration to reinforce or add strength to the ring.

Other objects and advantages of the invention will be apparent from the following description taken in conjunction with the accompanying drawing wherein:

FIG. 1 is a perspective illustrating one application of the invention in use;

FIG. 2, an enlarged horizontal section through FIG. 1;

FIG. 3, a rear view of the mask itself;

FIG. 4, a detail section illustrating the paper clip attachment of the elastic to the mask;

FIG. 5, a fragmentary detailed perspective of a slightly different form of hook;

FIG. 6, a detailed section illustrating an elastic member and its attaching means; and FIG. 7, a rear perspective of the elastic member and its attaching head.

Briefly stated, the mask of the present invention is a relatively thin, flexible, flat ring with internal and external diameters corresponding generally to the corresponding diameters of pneumatic tire or at least so that the portion of the tire desired to be protected will be covered when the ring is placed against the side of the same and secured in such position. In order to fasten the mask in place, hooks are provided in generally diametrically opposed locations, such hooks being adapted to have their points engage and anchor themselves on the tire to which the mask is applied, and with hooks attached to the intermediate portion of the mask by means of an elastic member and with the extremities of the elastic member anchored in the mask approximately 90° apart, such construction and combination of features permitting the application of the mask by the mere taking of a hook in each hand and by a single motion toward the tire to be masked, the hooks being separated under slight tension where applied to the tire to be masked and to remove they are separated in a similar manner and drawn from the tire, this making it possible to mask a tire and paint a wheel in one-half the time of that of the mechanism of the aforementioned patent and many times faster than by earlier conventional methods.

With continued reference to the drawing, an automobile wheel 10 is equipped with a pneumatic tire 11 mounted on a rim 12. The wheel 10 is adapted to be fastened by bolts 13 to a hub 14. In order to protect the pneumatic tire 11 from paint during the painting of the wheel and rim, the mask of the present invention is provided. This mask includes a relatively thin flexible flat ring 15 of substantially paper thin metal, plastic or other material.

The ring 15 has its inner edge provided with an inwardly curved stiffening portion 16 which fits snugly against the tire and in contact with the rim 12 and with the curvature reinforcing the ring. In like manner the outer edge of the ring 15 is provided with a flattened annulus 17 with a rounded or stepped portion 18 connecting it to the main body of the ring and due to its thinness flexibility and cross-sectional configuration when applied, the ring will be intimately engaged with the tire to which it is applied.

In order to mount the mask on the tire a pair of hooks 19 are provided in substantially opposite locations. These hooks have barbless points 20 of a character to readily engage the tread portion of the tire and with the eye of the hook 21, connected to an intermediate link 22, of an elastic band 23, having a hook 24 attached to each end and which hooks are received in openings 25 in the mask 15.

The openings 25 in which each of the elastic members 23 is secured preferably are spaced 90° apart so that the adjacent hooks between the two elastic members likewise will be 90° apart.

In lieu of the elastic members 23 and the hooks 24, conventional rubber bands and paper clips may be employed for fastening the hooks 19 in diametrically opposite positions on the mask 15. The openings 25 are relatively small and only an insignificant amount of paint can pass through them. If preferred, an elastic member 23' may be provided having a head 26 which can be forced through the opening 25 and provide a complete cover or closure for such opening and at the same time provide an anchoring means for the elastic to which the hook is applied.

In the application of the mask to the tire, the hooks attached to the opposite portions of the mask may be held in the hand thus supporting the relatively lightweight flexible mask and by the movement of the hands in substantially a single direction the hooks may be applied and the mask mounted in place. The mask may be removed by a substantially reverse motion of the hands and the moving the hooks from contact with the tire.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A painter's mask for pneumatic tires mounted on rims comprising a substantially flat thin masking ring of a size to cover the portion of the tire to be masked, said ring having an inner edge curved to provide a stiffening effect and snugly to engage the tire and to fit close to the rim on which the tire is mounted, the outer edge of said ring likewise being of a configuration to provide a stiffening effect, the ring being of such flexibility that pressure on opposite portions will cause it to flex into more intimate engagement with the tire to which it is applied, means for fastening said ring to the tire comprising multiple elastic members each having spaced ends and an intermediate portion, means for anchoring the spaced ends of one elastic member on said masking ring in opposition to the spaced ends of another of said elastic members likewise anchored to said masking ring, and a hook connected to the intermediate portion of each elastic member and engageable with the tire in a manner that the elastic member retains tension upon the masking ring.

2. A painter's mask comprising a substantially thin masking member of an appropriate size to cover the area to be masked, means for attaching said masking member, said means comprising a pair of elastic members having spaced ends connected at opposite portions of said masking member, and a hook mounted on each elastic member intermediate the spaced ends thereof, whereby said masking member can be applied by holding the hooks in the hands in spaced relation and said hooks applied to the member to be masked substantially in a single motion.

3. A painter's mask comprising a relatively thin masking member, a first elastic member having spaced ends attached to said relatively thin masking member, a second elastic member having spaced ends attached to said mask in spaced relation to the first elastic member, and hook means connected to each elastic member intermediate the spaced ends by which said masking member may be applied and retained on the member to be masked.

4. A painter's mask comprising a relatively thin masking member, at least two means attached to said masking member at spaced locations whereby the masking member may be applied and retained on a member to be masked, at least one of said means including an elastic member having spaced ends connected to said masking member and hook means connected to said elastic member intermediate the spaced ends thereof.

References Cited in the file of this patent

UNITED STATES PATENTS

| | | |
|---|---|---|
| 2,634,704 | Morrison | Apr. 14, 1953 |
| 2,726,634 | Horner | Dec. 13, 1955 |
| 2,821,130 | Hummel | Jan. 28, 1958 |
| 3,001,509 | Carpenter et al. | Sept. 26, 1961 |